(12) United States Patent
Cordaillat et al.

(10) Patent No.: US 7,712,504 B2
(45) Date of Patent: May 11, 2010

(54) MACHINE FOR ASSEMBLING AND VULCANISING TIRES

(75) Inventors: Dominique Cordaillat, Brindas (FR); Olivier Dailliez, Chamalieres (FR); Stéphane Beciu, Grigny (FR); Didier Coissard, Beaumont (FR); Christian Vaillant, Greenville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 995 days.

(21) Appl. No.: 11/455,326

(22) Filed: Jun. 19, 2006

(65) Prior Publication Data

US 2007/0029028 A1    Feb. 8, 2007

Related U.S. Application Data

(60) Provisional application No. 60/702,490, filed on Jul. 26, 2005.

(30) Foreign Application Priority Data

Jun. 17, 2005    (FR) .................................. 05 06245

(51) Int. Cl.
*B29D 30/10* (2006.01)
(52) U.S. Cl. ..................... 156/396; 156/406.2
(58) Field of Classification Search ................. 156/111, 156/396, 406.2, 133, 117, 397
See application file for complete search history.

(56) References Cited

U.S. PATENT DOCUMENTS

| | | | |
|---|---|---|---|
| 4,877,468 A * | 10/1989 | Siegenthaler | ............... 156/111 |
| 5,204,049 A | 4/1993 | Siegenthaler | |
| 5,217,562 A * | 6/1993 | Macchiarulo et al. | ....... 156/362 |
| 6,113,833 A | 9/2000 | Ogawa | |
| 6,143,110 A | 11/2000 | Laurent et al. | |

(Continued)

FOREIGN PATENT DOCUMENTS

EP    0 468 342 A    1/1992

(Continued)

*Primary Examiner*—Geoffrey L Knable
(74) *Attorney, Agent, or Firm*—Cohen Pontani Lieberman & Pavane LLP

(57) ABSTRACT

A machine for manufacturing tires (P) using at least one core (N) used as a reference surface of the manufacture of the tires (P) by moving consecutively from one manufacturing station to another from the start of assembly through to vulcanisation, comprising a first line of stations, oriented in a horizontal direction XX', capable of receiving the core whose axis of rotation rr' is oriented horizontally, and a second line of stations (200, 300, 300'), oriented in a horizontal direction YY', perpendicular to the direction XX', in which the stations are capable of receiving a core (N) whose axis rr' is oriented vertically. The first line of stations comprises a first (120) and a second (130) station for assembling the tire including member (121, 131) for grasping and driving the core (N) in rotation about a horizontal axis rr', merged with the axis XX', such members being placed opposite one another. A turning device (110) is movable in the direction XX' and is capable of transferring the core from one station to another within the first line of stations (120, 130) by making the axis rr' of the core effect a translation along the axis XX' and a rotation of 180° about a horizontal axis yy' parallel to the direction YY'.

17 Claims, 6 Drawing Sheets

U.S. PATENT DOCUMENTS

| | | |
|---|---|---|
| 2002/0153083 A1 | 10/2002 | Takagi |
| 2004/0238102 A1 | 12/2004 | Girard et al. |
| 2005/0126684 A1 | 6/2005 | Sieverding et al. |
| 2005/0133149 A1* | 6/2005 | Sieverding et al. ....... 156/130.5 |
| 2007/0187018 A1* | 8/2007 | Lacagnina et al. .......... 156/111 |

FOREIGN PATENT DOCUMENTS

| | | |
|---|---|---|
| EP | 0 776 756 A | 6/1997 |
| EP | 0 893 237 A | 1/1999 |
| EP | 1 481 791 A | 12/2004 |
| EP | 1 541 324 A2 | 6/2005 |
| EP | 1 541 325 A | 6/2005 |

* cited by examiner

MACHINE FOR ASSEMBLING AND VULCANISING TIRES

RELATED APPLICATIONS

This application claims priority from French patent application no. 05/06245 filed Jun. 17, 2005 and U.S. Provisional Patent Application Ser. No. 60/702,490 filed Jul. 26, 2005.

FIELD OF THE INVENTION

The invention relates to the manufacture of tires intended to equip vehicles and more particularly the arrangement of a machine intended for the manufacture of such tires.

BACKGROUND OF THE INVENTION

A process and machine for the manufacture of tires are known from the prior art, such as described in the patent EP 0 666 165 B1, wherein the arrangement of the manufacturing stations is simplified, and wherein the entirety of devices for carrying out the assembly and vulcanisation stages is concentrated on one chassis acting as a single platform intended to receive the mechanical elements of the machine.

This manufacturing process uses a rigid core which may be dismantled and which partially imposes its shape on the tire. The core is formed of plural elements which are separable from one another and which form, once assembled, a stable surface of revolution used for manufacturing a tire, from assembly where it acts as a reference surface for the application of various components, through to vulcanisation where it forms the mould of the internal portion of the tire. When it is assembled, the core can be grasped by each of the faces of its central portion, forming a rim, so as to be transferred from one station to another.

The first manufacturing stage includes assembling the elements of the core and positioning this in a station for assembling the components of the tire. The assembly stage includes depositing all the components of the tire consecutively on the core in a specified order of assembly. The whole is then transferred to a station in which the external moulding elements complement the core and is inserted into a vulcanisation chamber. Finally, after the stage of vulcanisation, the external mould and the core are removed from the tire and the elements of the core are cooled and re-assembled for the next cycle.

The transfer of the core from one station to another is ensued by carriages circulating on the chassis on which are fixed the assembly station, the vulcanisation station which is able to cure one or more tires simultaneously, the station for dismantling and re-assembling the core and the cooling station.

The highly compact nature of the machine elements, combined with extremely rapid cycle times makes it possible to have a high-performance process which is fully adapted to forming certain types of small-dimension tires.

The need to manufacture very complex or large-dimension tires is continuously growing in order to satisfy the fitting of modern vehicles whose requirements in terms of speed, strength and safety is increasing all the time. Moreover, it is difficult to respond to the evolution of market requirements by simply revising the dimensioning of the elements of the machine as described in the specification cited by way of reference.

In particular, the increase in number of components of a different kind and the increase in diameter of the cores in combination with the increase in diameter of the tires lead to a thorough modification of the machine cycles, in particular at the assembly station, which may bring about a tangible loss in productivity.

SUMMARY OF THE INVENTION

One object of the present invention is to provide a particular arrangement of the various elements of the machine. The core moves consecutively from one manufacturing station to another so as to carry out there one stage of manufacture from assembly of the components through to vulcanisation. This arrangement permits optimum use of the various stations so as to permit the manufacture of large-dimension or very complex tires in the best productivity conditions while retaining the advantages associated with compactness and transportability. This rearrangement gives rise in some cases to a fundamental challenge to the particular arrangement described in the above-mentioned patent.

According to one aspect of the invention, the various stations of the machine are arranged in a modular manner along two perpendicular axes.

A first line of stations is oriented in a horizontal direction referenced XX'. The stations are configured so as to receive the core with its axis of rotation disposed in a horizontal position.

A second line of stations is oriented in a horizontal direction YY' perpendicular to the direction XX'. The stations are so configured as to receive the core with its axis of rotation disposed in a vertical position.

Preferably, the first line of stations comprises assembly stations. The assembly stations have means for grasping and driving the core in rotation about a horizontal axis, and means of depositing the components forming the blank of the tire in the order and place required by the structure of the tire.

The assembly stations are composed of a frame supporting a rotary shaft comprising means for grasping the core by one of the faces of the rim of the core, which means are mounted in a cantilevered manner on the chassis. This type of assembly makes it possible to carry out easy transfer of the core from a transport means effecting grasping of the core by one of the faces of the rim, to one of the assembly stations on which the core is grasped by the other face of the rim.

The number of stations of this first line is determined by the complexity of the tire to be assembled and by the balance of cycle times to be conferred on the machine.

This first line also comprises a turning device for on the one hand transferring a core from one assembly station to another by translation in the direction XX' by arranging the core with its rotary shaft positioned horizontally and on the other hand to make the core effect a rotation of 90° about a horizontal axis yy', perpendicular to the axis of rotation of the core, so as to place it in a position for effecting transfer to the second line of stations.

One configuration comprising two assembly stations has been found particularly advantageous. In this case, it is in fact possible to have the two stations axially opposite one another. "Opposite" is taken to mean that their grasping means face one another in the direction XX'. This particular arrangement makes it possible to simplify the transfer cycle and to grasp the core to the extent that, in the horizontal position, the axis of the core is parallel to the direction XX' of displacement of the turning device.

To effect the transfer of the core from one assembly station to another, the turning device, after grasping the core on the first assembly means, makes the axis of rotation of the core perform a rotation of 180° about an axis yy' parallel to the direction XX', and positioned in this configuration substantially perpendicular to the direction XX', so that the grasping means of the second assembly station can grasp the core by the available face of the rim whilst keeping the axis of rotation of the core horizontal.

The machine according to the invention also comprises a second line of stations oriented in a horizontal direction YY' substantially perpendicular to the direction XX'. This second line comprises a station for handling the core comprising means for dismantling the elements of the core in order to free the tire after vulcanisation, and means for re-assembling the elements of the core before it is used for shaping the blank of the next tire.

The second assembly may comprise, if it is felt necessary, a cooling station disposed in alignment with the station for handling the core along the axis YY'. Cooling is preferably effected by immersion of part of the surface of the core in a refrigerated tub of water so as to reduce the cycle time of this last station.

One or more vulcanisation stations are placed in the extension of the preceding stations in the direction YY'. These vulcanisation stations support the external part of the mould, which comprises the two shells for moulding of the sides and lower region, as well as the part intended to mould the tread. This arrangement of the vulcanisation station thus makes it possible to reduce the cycle time considerably at the station for handling the core since the external elements of the mould are connected to the press.

Finally, a transfer carriage makes it possible to move a core by translation in the direction YY' between the turning device, the station for handling the core, the cooling station if there is one, and the vulcanisation station(s). This transfer carriage preferably comprises at least one gripper for grasping and holding the core by its rim so that the axis of rotation of the core is disposed vertically. The stations for handling, cooling and vulcanisation are therefore disposed to receive the core in a vertical axis.

The change of axis between the stations of the first line and the stations located in the second line is effected by the turning device, which then effects a rotation of 90° about the axis yy' and which can be positioned along the axis XX' so that the axis of rotation of the core is aligned with the axis of the grasping and holding means disposed on the transfer carriage.

It would be entirely possible to conceive a machine wherein the transfer and processing of the core in the core-handling station, the cooling station and the vulcanisation station are effected whilst keeping the axis of rotation of the core in a horizontal position. However, it should be noted that this last arrangement does not offer the best options in terms of compactness of the machine, quality control of curing, and the geometry of the parts of the core at the moment when it is subsequently re-assembled. That is why the machine according to the invention comprises two lines of stations configured to receive the core with its axis of rotation oriented in a horizontal position and then in a vertical position.

The manner of arranging the different stations according to the invention offers a very high level of modularity. Thus, it is possible to distribute the means for carrying out application of the various components in a balanced manner between the two assembly stations. Preferably, it will be opted to place on the first assembly station the means for depositing the cords forming the carcass reinforcement of the tire, and to place the means for depositing the cords forming the reinforcement of the envelope crown on the second assembly station. It is thus entirely possible, for a specified tire structure, to balance the cycle time necessary for carrying out the assembly operations in each of the stations by consequently distributing depositing means of the various products between the two assembly stations.

In a similar manner, the addition of a supplementary vulcanisation means can be effected without the need for fundamental modification of the structure of the machine.

The cycle times of the cooling stations and the station for handling the core are reduced sufficiently proportionately in order to make the machine operate with one or two vulcanisation stations.

The number of cores which it is possible to assemble simultaneously on the machine will depend on the number of vulcanisation means used. Thus, in a configuration with a single vulcanisation means, four cores will suffice to optimize the cycle time. It is advantageous to add at least one supplementary core when it is expected to use two vulcanisation means.

In these conditions, by simple addition or removal of a vulcanisation means, and according to the diameter or complexity of the assembly to be realised, it is possible to adapt the configuration of the machine so as to obtain the best output from the plant. When plural machines of this type are in operation on one manufacturing site, it is quite conceivable that by standardisation of the vulcanisation means it is possible to carry out these modifications with a small number of supplementary vulcanisation means which may be allotted to the machines set up for creating dimensions having reduced assembly cycles compared to the vulcanisation cycles.

It is also possible for reasons linked to transport, installation and implementation of the machine, to mount the various stations on common chassis, permitting handling and simultaneous transfer of an assembly of stations fixed to the same chassis. To this end, the first assembly of stations formed of the two assembly stations and the turning device can easily be mounted on a first chassis. A second assembly comprising the core-handling station and the cooling station, if there is one, is mounted on a second chassis. Finally, each of the vulcanisation stations is mounted on its own chassis.

The stages of the manufacturing process are monitored by a computer which triggers the sequences of movements of the various means outlined above. These triggering means and the control means for the elements of the machine can also be advantageously placed on the chassis supporting the stations.

BRIEF DESCRIPTION OF THE DRAWINGS

FIGS. 1 to 6 support and illustrate the following description, being based on an embodiment of a machine according to the invention and in which:

FIG. 1 shows a simplified perspective view of a machine according to the invention, FIG. 2 shows a diagrammatic plan view of the machine, FIG. 3 shows a diagrammatic side view of the machine, FIGS. 4 and 5 show diagrammatic detailed views of the cooling station, FIG. 6 shows a diagrammatic perspective view of a machine according to the invention equipped with two vulcanisation means.

DETAILED DESCRIPTION OF THE DRAWINGS

The numeric references given in the figures are identical from one figure to another and make it possible to refer to plural figures simultaneously in order to make for a clear description of the relative placing of the various stations or elements of the machine.

The means not essential to the understanding of the invention are not all shown in the Figures in order to make for easy, unencumbered reading. This applies therefore to means allocated for the application of the rubber mixes to a core, which are described in a non-limiting manner in EP 0 264 600 or EP 0 400 496. In the same way, the means for depositing the cords (not shown) intended for the carcass reinforcement or crown reinforcement are described in the publications EP 0 243 851, EP 0 248 301, EP 0 353 511, EP 0 519 294, EP 0 519 295, EP 0 580 055 or EP 0 582 215. Finally, it is possible to refer to the publication EP 1 075 928 in order to obtain, by non-limiting example, the detailed description of a rigid core comprising a connecting rim and whose use is compatible with the machine forming the subject of the invention.

Figure 1:
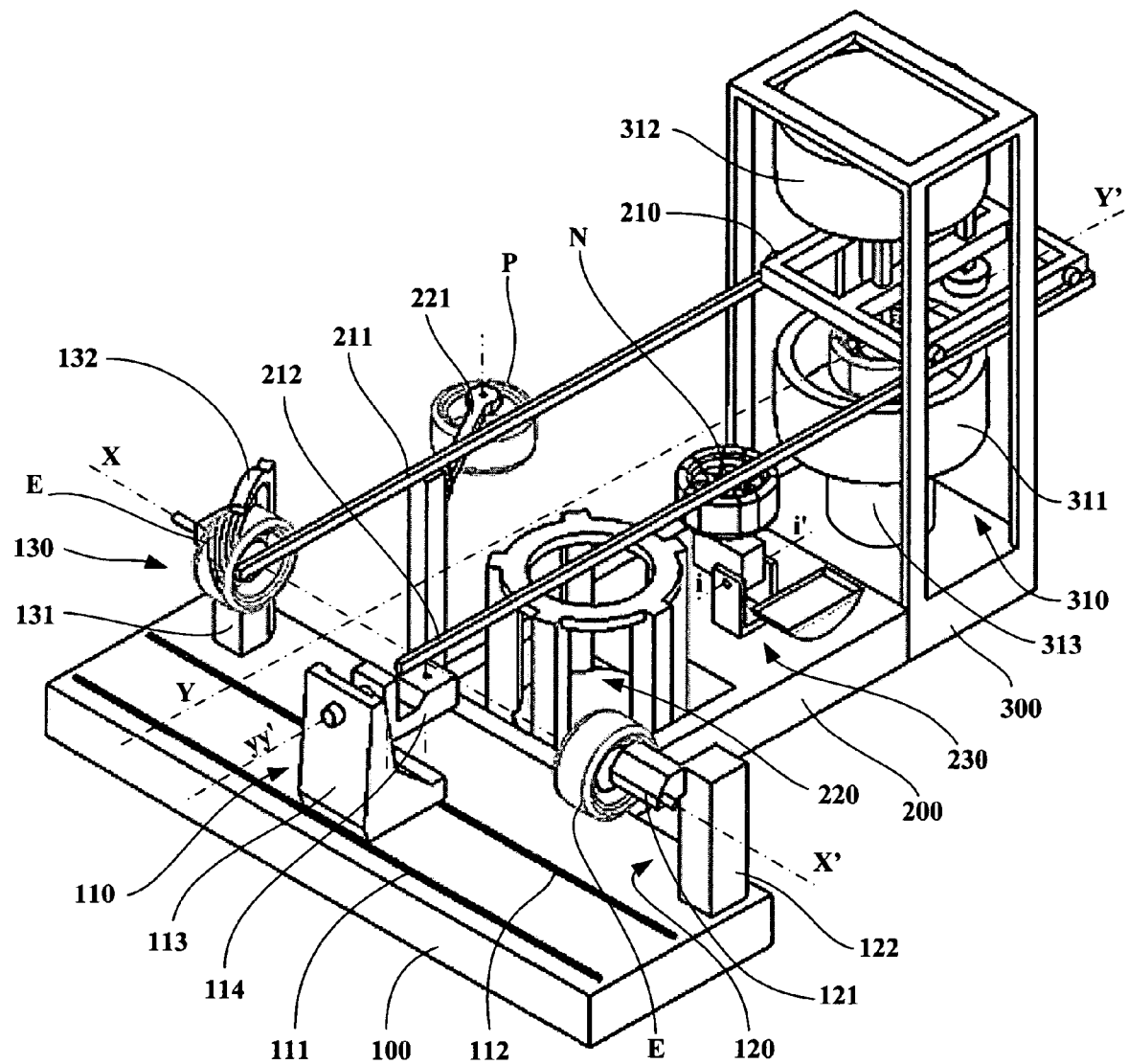
Figure 2:
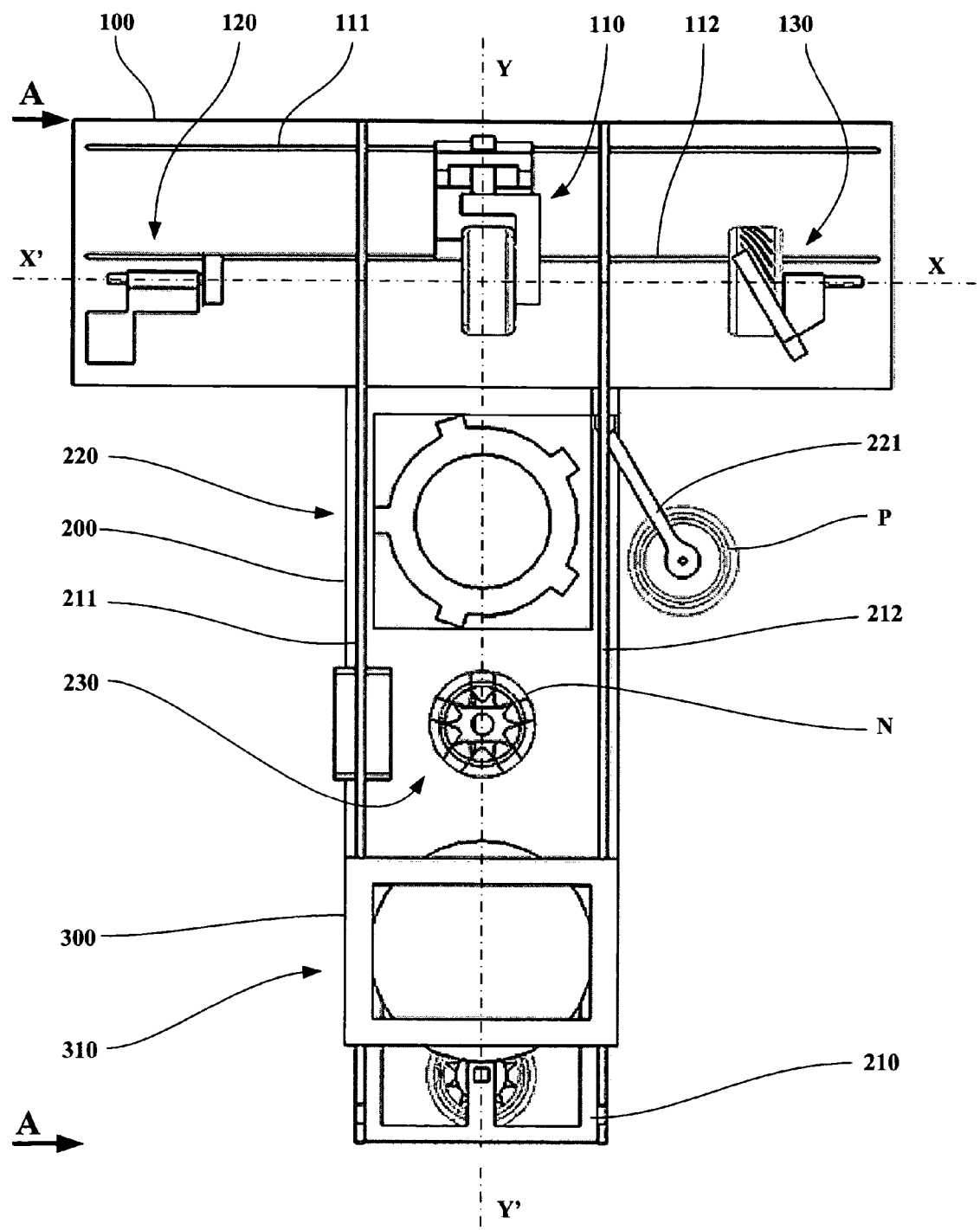
Figure 3:
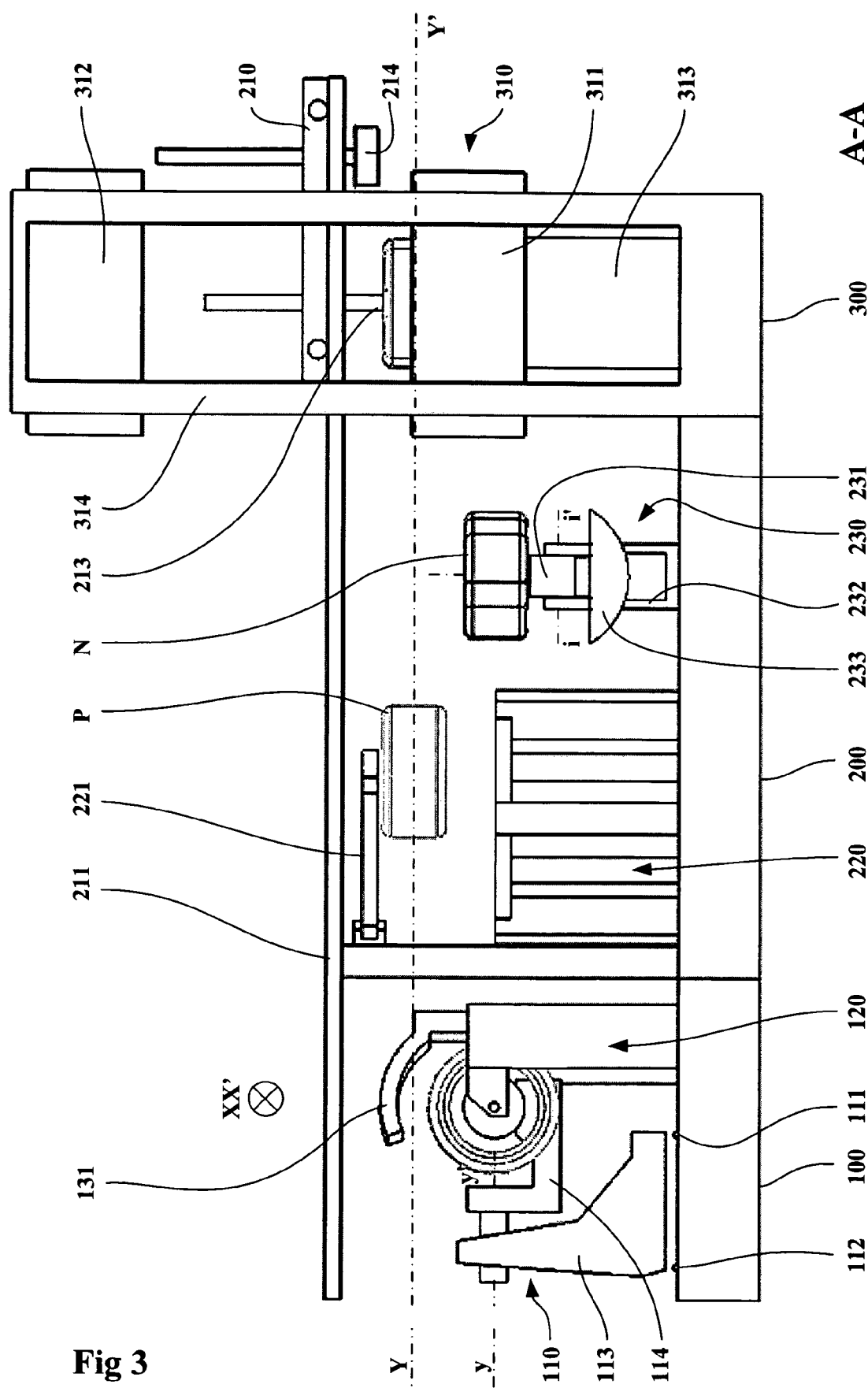

FIGS. 1, 2 and 3 show, in perspective view, in plan view or in side view, a machine according to the invention equipped with a single vulcanisation means and comprising a first chassis 100 oriented in a first horizontal direction XX'. This chassis supports a first assembly station 120 formed of a frame 122 supporting a means 121 for grasping and setting in rotation about a horizontal axis, aligned in the direction XX', a core. The core supports the elements forming the blank E of a tire. This first assembly station comprises a means (not shown) for depositing cords forming a carcass reinforcement and means (not shown) for depositing rubber products.

The chassis 100 also supports a second assembly station 130 formed of a frame 132 carrying a means 131 of grasping and setting in rotation a core. The second assembly station comprises a means 132 for depositing crown reinforcement cords and means of depositing rubber products (not shown). These two stations are placed opposite one another in a direction XX'.

A turning device 110, comprising a frame 113 circulating on rails 111, 112 oriented in the direction XX', carries a gripper 114 for grasping the core by its rim. The gripper 114 is connected to the frame 113 by a rotary hub rotating about an axis yy' which is horizontal and perpendicular to the direction XX'. The turning device moves from one assembly station to another in the direction XX'. In order to grasp a core by the rim on the first assembly station, it suffices to place the axis of the gripper 114 in a horizontal position by pivoting the gripper about the axis yy' and to grasp the core by the rim. During the movement from the first assembly station to the second assembly station, rotation is effected through 180° about the axis yy', so as to present the core by its hooking face on the grasping means disposed on the frame 132 of the second assembly station 130. This arrangement makes it possible to present the core and to effect hooking on to the assembly station by following the movement of the turning device in the direction XX'.

A second chassis 200 adjacent to the first chassis 100 is disposed along an axis YY' perpendicular to the direction XX'. This second chassis supports a station for handling the core 220 and a cooling station 230.

A transfer carriage 210 circulates on two rails 211 and 212 and moves in the direction YY' above the core-handling stations and the cooling station. The rails 211, 212 extend above the chassis 100 so as to permit the carriage 210 to overhang the gripper 114 located on the turning device 110. The transfer carriage 210 supports one or more grippers 213, 214 actuated by a vertical up-and-down movement allowing a core to be deposited in or withdrawn from one of the above-mentioned stations, and to effect holding of the core during its transfer from one station to another.

The station for handling the core comprises means of dismantling the elements of the core in order to separate the core from the tire once vulcanisation is finished. A bracket 221 makes it possible to evacuate the tire P towards a transfer and evacuation means (not shown). The handling station also has means for re-assembling the core in order to make it suitable again for use in forming the next tire blank. For more details concerning this station, the reader is referred to the publication EP 0 666 165 already cited in order to obtain a description of the means used, taking care to place the axis of the core in a vertical position.

It will nevertheless be noted that, according to the invention, the core-handling station is so contrived that it allows the handling of cores by disposing their axis of rotation to the vertical, which is favourable to the geometric quality of the assembled core. It will also be noted that, as is stated above, only the operation of dismantling and re-assembling the core is carried out in this station. In fact, the external elements of the mould, i.e. the shells and the part for moulding the tread, are fixed permanently on the elements of the vulcanisation station. This arrangement makes it possible to obtain a sufficiently short cycle time to carry out the processing of a core in a sufficiently short time which is compatible with the implementation of two vulcanisation presses.

It may be found necessary, when the curing temperature is high or when the material in contact with the core is temperature-sensitive, to cool the core before starting manufacture of the next tire.

Figure 4:
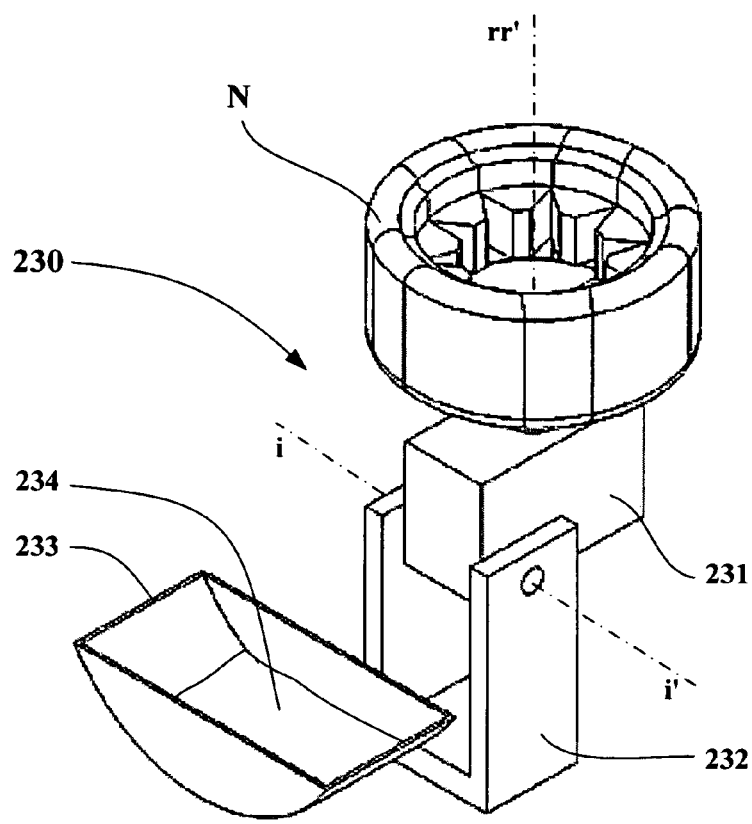
Figure 5:
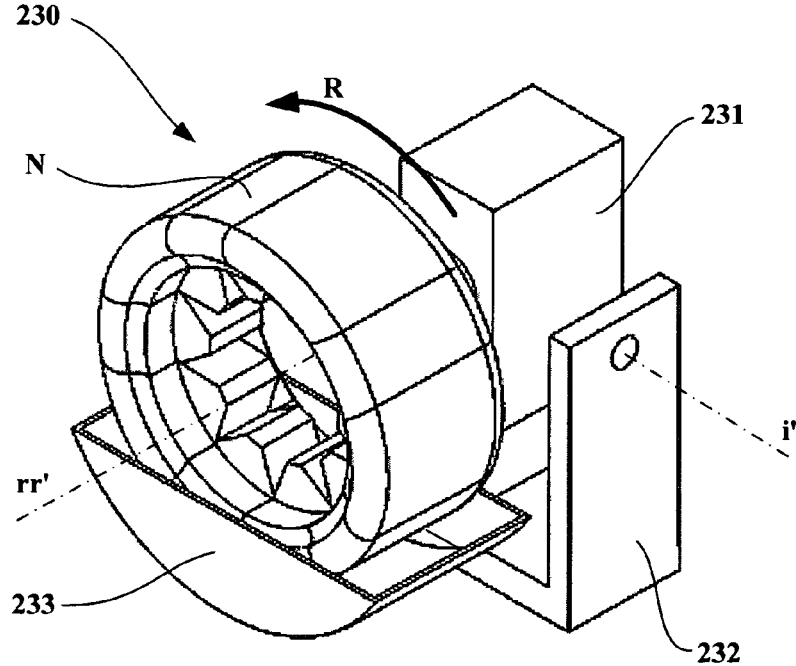
Figure 6:
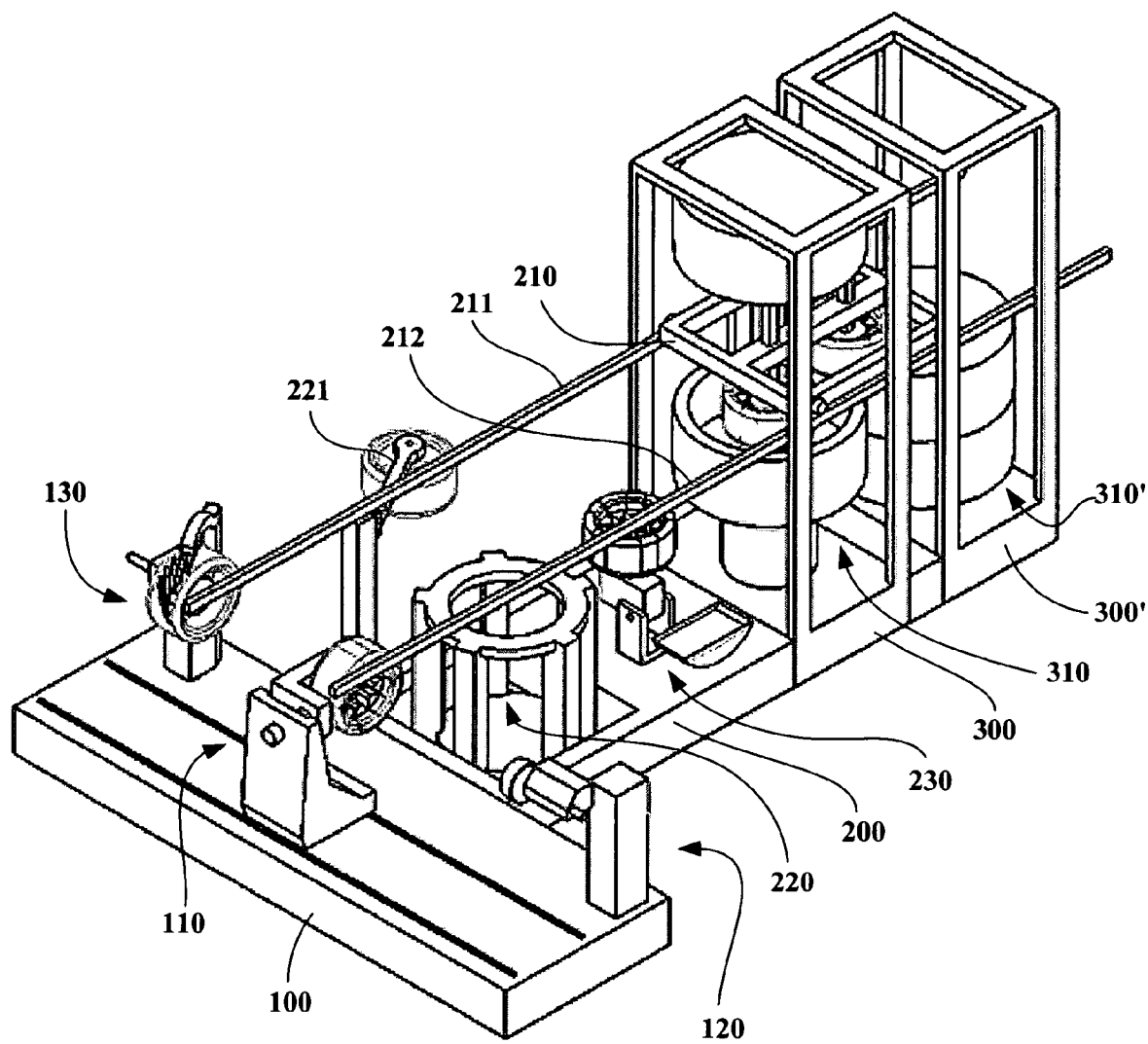

The cooling station 230, whose details are shown in FIGS. 4 and 5, comprises a frame 232 supporting a means 231 for grasping, holding and setting in rotation the core N. This means 231 is articulated on the frame about a horizontal axis ii'. A tub 233 contains a specified volume of refrigerated water 234. By making the holding means 231 pivot about the axis ii', it is possible to place the core in a first position in which the axis of rotation rr' of the core is vertical and can therefore be aligned with the axis of one of the grippers 213, 214 of the transfer carriage 210, and in a second position in which the axis rr' of the core is disposed horizontally. In this second position, it is arranged that the external surface of the core is partially immersed in the cooling water 234 contained in the tub 233.

It is therefore possible to set the core in rotation in the direction of the arrow R in order that the entire surface of the core is immersed with each rotation. The fine coating of water deposited during immersion evaporates when the corresponding surface of the core passes through free air, which has the effect of accelerating heat dissipation.

The chassis 300 supports the vulcanisation means 310 composed of two half-vats 311 and 312. The lower half-vat 311 supports the lower shell and the mould elements for moulding the tread, and the upper half-vat 312 supports the upper shell. The upper half-vat 312 slides vertically over the frame 314 so as to leave open sufficient space for the carriage 210 to centre one of the grippers 213, 214 to the right of the mould in order to permit depositing of a core carrying a tire blank or extraction of the core supporting the vulcanised tire. After releasing the carriage 210, the moulding space is closed by lowering the upper half-vat 312 into contact with the lower half-vat 311. It is also possible to lower the assembly formed by the upper and lower half-vats by means of a hydraulic piston 313 so as to trigger passage of the carriage 210 above the half-vat 312 when it is desired to have a second vulcanisation means 310' as an extension of the first means 310.

Figure 7:
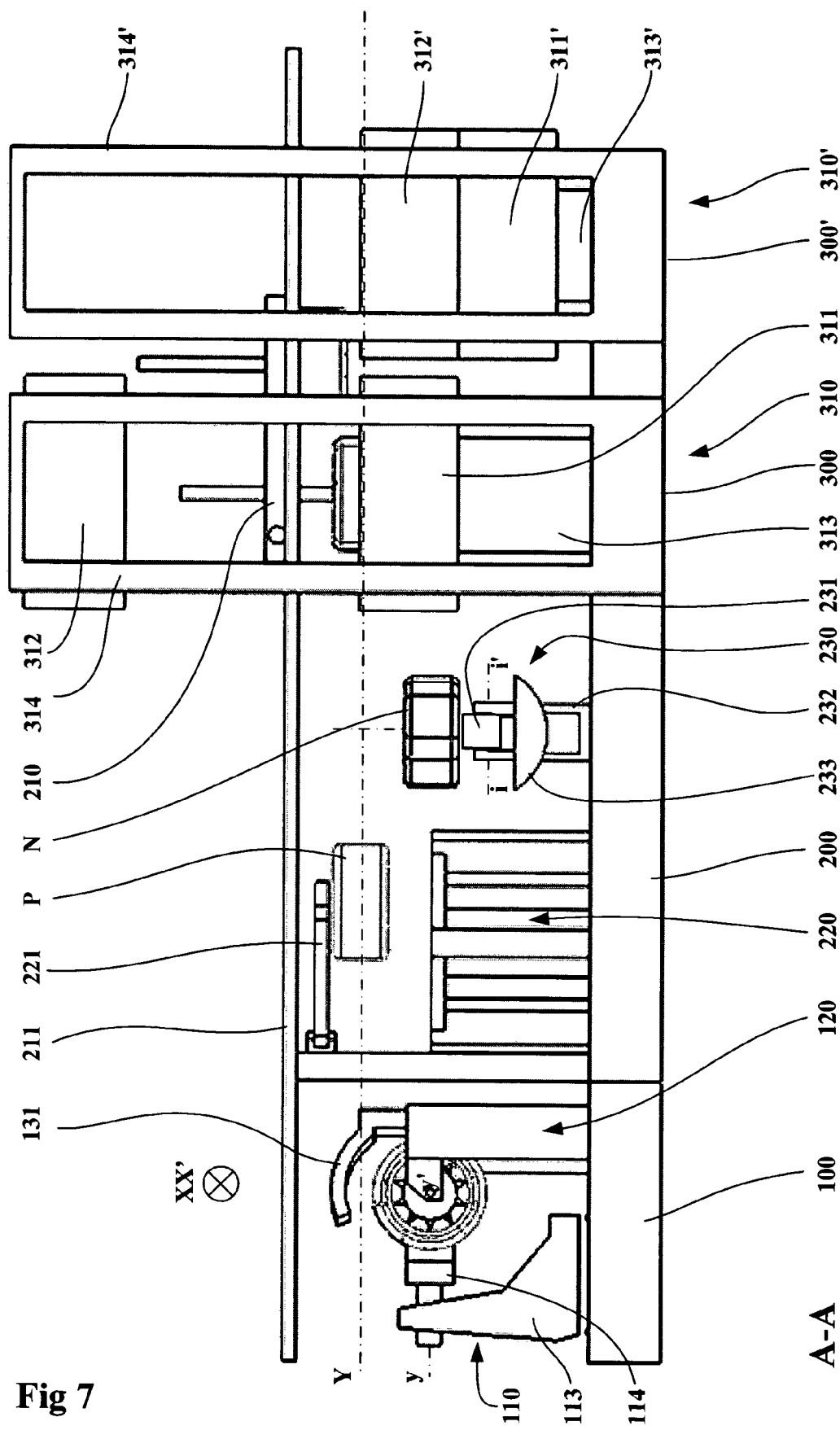
FIG. 7 shows a plan view of the machine shown in FIG. 6.

This configuration is shown in FIG. 7, in which a first vulcanisation means 310 is shown in an open position and in which the second vulcanisation means 310' is shown in the closed position. Identical elements of the vulcanisation means 310' have the same numbering as those of the vulcanisation means 310 but provided with a prime. It will be noted that the rails 211 and 212 are extended in the direction YY' in order to allow the grippers 213 and 214 of the transfer carriage to position themselves to the right of the vulcanisation means 310'.

The description above has the various stations mounted rigidly on chassis. It should be noted that this particular arrangement is not necessary to the implementation of the invention, but may have an advantage in some circumstances, in particular when it is found useful to transfer the machine from one manufacturing unit to another, or when it is desired to add a supplementary vulcanisation station.

In another alternative embodiment, it is also possible to dispose the protection caps over all the faces of the machine so as to insulate the surroundings from the noise sources of the various depositing stations.

The stages of the process according to the invention can be broken down as follows:

transfer the core N to the first assembly station 120 by means of the turning device 110, whilst disposing the axis of rotation of the core in a horizontal position, apply consecutively to the core, by taking as an assembly reference the surface of the core, part of the components of the tire, being the part comprising the cords forming the carcass reinforcement, pick up again the core N supporting part of the tire blank E by means of the turning device 110 and transfer the core from the first assembly station 120 to the second assembly station 130, by making the core perform a rotation of 180° about the axis yy', apply consecutively to the core N the remaining part of the components of the tire, being the part comprising the cords intended to form the crown reinforcement, so as to obtain a complete tire blank E, position the core N supporting the tire blank E by means of the turning device 110 in alignment with one of the grippers 213, 214 located on the transfer carriage 210, whilst disposing the axis of the core in a vertical position by rotation about the axis yy', transfer the core supporting the tire blank E by means of the transfer carriage 210 to one of the vulcanisation stations 310, 310' placed in an open position, and from which the core supporting the previous tire vulcanised will have been removed in advance, deposit the core supporting the tire blank E in one of the vulcanisation stations 310, 310', close the moulding space and proceed to vulcanisation of the tire, after opening the moulding space, remove the core supporting the vulcanised tire P from the vulcanisation station by means of the transfer carriage 210 and transfer the core to a core-handling station 220, dismantle the core in order to free the tire and evacuate the tire by means of a bracket 221, re-assemble the core N at the core-handling station 220 so as to obtain a stable surface of revolution, transfer the re-assembled core N from the core-handling station 220 to the turning device 110 by means of the transfer carriage 210.

When it is found necessary to add a cooling station, the stage of re-assembling the core is followed by transfer of the re-assembled core N to the cooling station 230, where the core is cooled until the desired surface temperature is reached. Once this operation is complete, the core N is transferred to the turning device 110 by means of the transfer carriage 210.

The stages described above make it possible to follow the cycle of forming a tire on a core. Obviously, the machine permits the simultaneous manufacture of plural tires on different cores. The movements of the turning device and the transfer carriage are determined by the cycle time necessary for the completion of the operations to be carried out at each station. To this end, the implementation of the known techniques of programming and actuation of complex machines is found particularly effective.

We claim:

1. A machine for manufacturing tires (P) using at least one core (N) composed of plural elements capable of being dismantled, and forming in the configuration used for assembly a stable surface of revolution with axis of rotation rr' and having a continuous form, close to the final manufactured form of the tire, the core being used as a reference surface of the manufacture of the tires (P) by moving consecutively from one manufacturing station to another from the start of assembly through to vulcanisation, wherein the machine comprises:

a first line of stations, oriented in a horizontal direction XX', in which the stations are capable of receiving a core (N) whose axis of rotation rr' is oriented horizontally;

a second line of stations, oriented in a horizontal direction YY', perpendicular to the direction XX', in which the stations are capable of receiving a core (N) whose axis is oriented vertically, wherein the first line of stations comprises a first (120) and a second (130) station for assembling the tire, each comprising means (121, 131) of grasping and driving the core (N) in rotation about a horizontal axis rr', merged with the axis XX', the means being placed opposite one another so that their grasping means face one another in the direction XX'; and a turning device (110), movable in the direction XX', and capable of transferring the core from one station to another within the first line of stations (120, 130), by making the axis rr' of the core effect a translation along the axis XX' and a rotation of 180° about a horizontal axis yy' parallel to the direction YY' so that the core can be grasped by the oppositely facing means of the first and second stations for transfer to the first and second stations.

2. The machine according to claim 1, wherein the first line of stations (120, 130) comprises means of depositing the various components forming the tire blank in the order and place required by the structure of the tire.

3. The machine according to claim 2, wherein the first assembly station (120) comprises means for depositing the cords forming the carcass reinforcement.

4. The machine according to claim 2, wherein the second assembly station (130) comprises means (132) for depositing the cords forming the crown reinforcement.

5. The machine according to claim 1, wherein the second line of stations comprises:

a station for handling the core (220), one or more vulcanisation stations (310, 310'), a transfer carriage (210) for moving the core by translation in the direction YY' between the turning device (110), the core-handling station (220) and the vulcanisation station(s) (310, 310'), by keeping the axis of rotation of the core in a vertical position by means of at least one gripper (213, 214) capable of grasping the core by its central portion and keeping the axis rr' of the core in a vertical position.

6. The machine according to claim 5, wherein the transfer carriage (210) moves vertically over the turning device (110), the core-handling station (220), and the vulcanisation stations (310, 310').

7. The machine according to claim 6, wherein the turning device (110) and the transfer carriage (210) are capable of being positioned opposite one another so that the core (N) can be grasped by a gripper (213, 214) located on the transfer carriage (210) or can be deposited by a gripper (213, 214) of the transfer carriage (110) on to a gripper (114) of the turning device (110,) the axis of rotation rr' of the core being placed in a vertical position.

8. The machine according to claim 7, wherein the grippers (213, 214) carried by the transfer carriage (210) are capable of carrying out translational movements in the vertical direction, allowing the core to be deposited on to the gripper (114) of the turning device (110), and to the core-handling station (220) and the vulcanisation station (310, 310').

9. The machine according to claim 5, wherein the transfer carriage (210) comprises two grippers (213, 214) aligned in the direction YY'.

10. The machine according to claim 5, comprising a cooling station (230) disposed in alignment with the vulcanisation stations (310, 310') and the core-handling station (220) and being accessible by the at least one gripper (213, 214) carried by the transfer carriage (210).

11. The machine according to claim 5, wherein the core-handling station (220) comprises means for dismantling the elements of the core in order to free the tire after vulcanisation, and means for re-assembling the elements of the core before it is used to form the blank (E) of the next tire, and wherein the means are configured to keep the axis of rotation of the core in a substantially vertical direction.

12. The machine according to claim 5, comprising an evacuation bracket (221) for the tire (P), capable of grasping the tire after this has been separated from the core (N), and of transferring the tire (P) to an evacuation means.

13. The machine according to claim 5, wherein the vulcanisation station (310, 310') supports the external part of the mould comprising two shells for moulding the sides and the lower region, and the part of the mould intended for moulding the tread.

14. Machine according to claim 5, comprising two vulcanisation stations (310, 310').

15. The machine according to claim 10, wherein the core-handling station (220) and the cooling station (230) are mounted on a common chassis (200).

16. The machine according to claim 5, wherein each of the vulcanisation stations (310, 310') is mounted on an independent chassis (300, 300').

17. The machine according to claim 1, wherein the turning device (110), the first (120) and the second (130) assembly station are mounted on a common chassis (100).

\* \* \* \* \*